United States Patent
Gates et al.

(10) Patent No.: US 12,523,164 B2
(45) Date of Patent: Jan. 13, 2026

(54) FASTENER ASSEMBLY FOR A GAS TURBINE ENGINE

(71) Applicant: RTX Corporation, Farmington, CT (US)

(72) Inventors: Roger Gates, West Hartford, CT (US); Gregory E. Reinhardt, South Glastonbury, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/239,581

(22) Filed: Aug. 29, 2023

(65) Prior Publication Data

US 2025/0075637 A1  Mar. 6, 2025

(51) Int. Cl.
| | | |
|---|---|---|
| *F16B 19/02* | (2006.01) | |
| *F01D 25/24* | (2006.01) | |
| *F16B 31/04* | (2006.01) | |

(52) U.S. Cl.
CPC .......... *F01D 25/243* (2013.01); *F16B 31/04* (2013.01); *F05D 2260/31* (2013.01); *F16B 2200/506* (2018.08)

(58) Field of Classification Search
CPC ...... F01D 25/24; F01D 25/243; F01D 25/246; F01D 21/04; F16B 19/02; F16B 5/02; F16B 5/0241; F16B 5/0258; F16B 2200/506

See application file for complete search history.

(56) References Cited

U.S. PATENT DOCUMENTS

| | | | |
|---|---|---|---|
| 6,467,988 B1 | 10/2002 | Czachor | |
| 6,524,068 B2 | 2/2003 | Carter, Jr. | |
| 7,056,053 B2* | 6/2006 | Schilling | ................. F16B 43/02 |
| | | | 411/537 |
| 9,279,325 B2* | 3/2016 | Nanivadekar | ........... F16B 39/01 |
| 10,247,038 B2* | 4/2019 | Kappes | ................. F01D 21/045 |
| 11,167,845 B2 | 11/2021 | Schank | |
| 11,365,688 B2 | 6/2022 | Molesini | |
| 2013/0149139 A1 | 6/2013 | Wallace | |
| 2018/0112557 A1 | 4/2018 | Kappes | |
| 2018/0340447 A1* | 11/2018 | Karafillis | .............. F01D 21/045 |
| 2022/0235673 A1 | 7/2022 | Farabow, III | |
| 2023/0193945 A1 | 6/2023 | Heeter | |

OTHER PUBLICATIONS

EP Search Report for EP Patent Application No. 24197419.5 dated Jan. 29, 2025.

* cited by examiner

*Primary Examiner* — Nathaniel E Wiehe
*Assistant Examiner* — Maxime M Adjagbe
(74) *Attorney, Agent, or Firm* — Getz Balich LLC

(57) ABSTRACT

A fastener assembly for affixing two flanges to a casing of a gas turbine engine is provided. The fastener assembly includes a bolt, a fastener, and first and second spacers. The bolt has a supporting shaft extending from a head and a thread portion. The supporting shaft has a diameter larger than a diameter of the thread portion. The fastener is configured to releasably mate with the thread portion. The first spacer surrounds a portion of the thread portion and is disposed between the fastener and a first flange. The second spacer surrounds the supporting shaft and is disposed between a second flange and the bolt head. The supporting shaft engages holes in the first flange, the casing, and the second flange. At least one of the first and second spacers absorbs a portion of a tensile load acting on the bolt.

15 Claims, 4 Drawing Sheets

FASTENER ASSEMBLY FOR A GAS TURBINE ENGINE

BACKGROUND OF THE DISCLOSURE

1. Technical Field

The present disclosure relates to gas turbine engines in general and to fastener assemblies for affixing casing flanges of the gas turbine engine in particular.

2. Background Information

During operation of a gas turbine engine, a rotor stage may become unbalanced, for example, during a Fan Blade Out (FBO) event, subjecting an engine casing of the gas turbine engine to high rotating bending moments. These bending moments introduce a prying action on the case flanges, subjecting the bolts affixing the case flanges to the casing to significant tension and bending forces often causing failure of the bolt. The casing must handle a significant out of balance loading created by the unbalanced rotor. This periodic out of balance loading is related to the rotation of the rotor stage. In some large diameter rotors, the out of balance loading approaches 500,000 pounds, which is a significant periodic loading on the casing and the fasteners installed therein.

In many applications, there is little space within the casing flange to accommodate an extended axial length fastener or extended spacers. Additionally, the current arrangement subjects the threaded portion of the bolt to significant forces. What is needed is a fastener assembly configured to fit within a confined axial length of the casing flange, one that has an improved ability to avoid bending at the threaded portion, and one that has an improved ability to withstand the significant tension and bending forces generated by an unbalanced rotor stage.

SUMMARY OF THE DISCLOSURE

According to an aspect of the present disclosure, a fastener assembly for affixing two flanges to a casing of a gas turbine engine is provided. The fastener assembly includes a bolt, a fastener, a first spacer, and a second spacer. The bolt has a supporting shaft extending from a head at a proximal end and a thread portion extending from a distal end opposite the proximal end. The supporting shaft has a diameter larger than a diameter of the thread portion. The fastener is configured to releasably mate with the thread portion. The first spacer surrounds a portion of the thread portion and is disposed between the fastener and a first flange. The second spacer surrounds the supporting shaft and is disposed between a second flange and the bolt head. The supporting shaft engages holes in the first flange, the casing, and the second flange. At least one of the first spacer and the second spacer absorbs a portion of a tensile load acting on the bolt.

In any of the aspects or embodiments described above and herein, at least one of the first spacer, the second spacer, and the bolt may deforms to allow at least one of the first flange and the second flange to separate from the casing.

In any of the aspects or embodiments described above and herein, at least one of the first spacer and the second spacer may reduce a stiffness of the bolt.

In any of the aspects or embodiments described above and herein, at least one of the first spacer and the second spacer may reduce a bending strain on the thread portion of the bolt.

In any of the aspects or embodiments described above and herein, at least one of the first spacer and the second spacer may have a yield strength (YS) less than a YS of the bolt.

According to an aspect of the present disclosure, a fastener assembly for affixing two flanges to a casing of a gas turbine engine is provided that includes a bolt and a fastener. The bolt has a head at a proximal end and a thread portion extending from a distal end opposite the proximal end. The bolt has a pitch diameter shank extending from the head and a large shank disposed between the thread portion and the pitch diameter shank. The fastener is configured to releasably mate with the thread portion. The fastener is configured to maintain a first flange in contact with the casing and the head of the bolt is configured to maintain a second flange in contact with the casing. The fastener assembly accommodates separation of at least one of the first flange and the second flange from the casing of the gas turbine engine by allowing bending of the bolt along the pitch diameter shank.

In any of the aspects or embodiments described above and herein, the fastener may have an inner circumferential surface with threading complementary to the thread portion of the bolt and an outer surface interrupted by a mating surface. The mating surface is complementary to a surface of the first flange to prohibit rotation of the fastener during rotation of the bolt within the fastener assembly.

In any of the aspects or embodiments described above and herein, the fastener assembly may include a first spacer having an inner diameter greater than an outer diameter of the thread portion and disposed between the fastener and the first flange. The fastener may have a face disposed perpendicular to a longitudinal axis of the fastener. The face may be interrupted by a relief. The relief may allow at least one of the first spacer and the face of the fastener to deform to contribute to accommodating the separation of the at least one of the first flange and the second flange from the casing of the gas turbine engine.

In any of the aspects or embodiments described above and herein, the fastener assembly may include a second spacer having an inner diameter greater than an outer diameter of the pitch diameter shank and disposed between the second flange and the bolt head. The second spacer may contribute to allowing the bending of the bolt along the pitch diameter shank.

In any of the aspects or embodiments described above and herein, the first spacer may have a yield strength (YS) that is less than a yield strength (YS) of the fastener.

In any of the aspects or embodiments described above and herein, the second spacer may have a yield strength (YS) that is less than a yield strength (YS) of the bolt.

In any of the aspects or embodiments described above and herein, the fastener and the first spacer may be disposed within a channel of the first flange.

In any of the aspects or embodiments described above and herein, at least one of the pitch diameter shank and the second spacer may provide a flexible portion of the bolt.

In any of the aspects or embodiments described above and herein, the separation of at least one of the first flange and the second flange from the casing of the gas turbine engine may allow for load sharing to adjacent fastener assemblies within the casing.

In any of the aspects or embodiments described above and herein, at least one of wiring and plastic deformation of the fastener may affix the fastener to the bolt.

In any of the aspects or embodiments described above and herein, the face may be defined by an annulus interrupted by the relief extending from an exterior edge and towards an interior edge of the annulus, and the relief may extend from an exterior edge of the annulus located closest to a longitudinal axis of the casing.

In any of the aspects or embodiments described above and herein, the deformation of the first spacer may contribute to accommodating separation of at least one of the first flange and second flange from the casing.

In any of the aspects or embodiments described above and herein, the large shank may engage a hole in the first flange to establish an engagement point and the pitch diameter shank bends about the engagement point.

In any of the aspects or embodiments described above and herein, the fastener assembly may accommodate separation of at least one of the first flange and the second flange from the casing of the gas turbine engine when the pitch diameter shank bends to a bent configuration and the thread portion remains in a straight configuration.

According to an aspect of the present disclosure, a fastener assembly for affixing two flanges to a casing of a gas turbine engine is provided. The fastener assembly includes a bolt, a fastener, a first spacer, and a second spacer. The bolt has a head at a proximal end and a thread portion extending from a distal end opposite the proximal end. The bolt has a pitch diameter shank extending from the head and a large shank disposed between the thread portion and the pitch diameter shank. The fastener is configured to releasably mate with the thread portion. The first spacer has an inner diameter greater than an outer diameter of the thread portion and is disposed between the fastener and the first flange. The second spacer has an inner diameter greater than an outer diameter of the pitch diameter shank and is disposed between the second flange and the bolt head. The first spacer is configured to maintain a first flange in contact with the casing. The second spacer is configured to maintain a second flange in contact with the casing. At least one of deforming the first spacer, deforming the second spacer, and bending the bolt along the pitch diameter shank contributes to accommodate separation of at least one of the first flange and the second flange from the casing of the gas turbine engine.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

DETAILED DESCRIPTION

Figure 1:
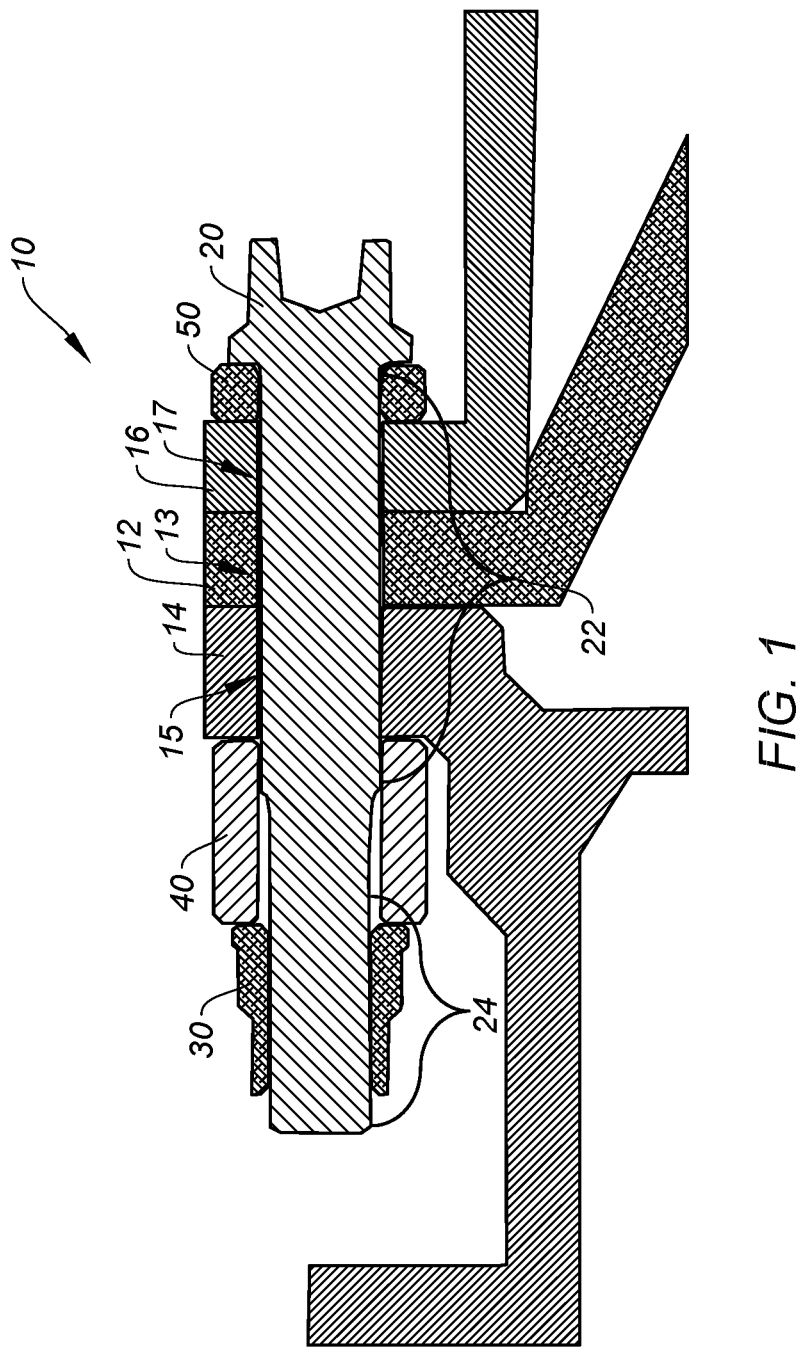
FIG. 1 is a partial diagrammatic sectional view of a casing of a gas turbine engine.
Figure 2:
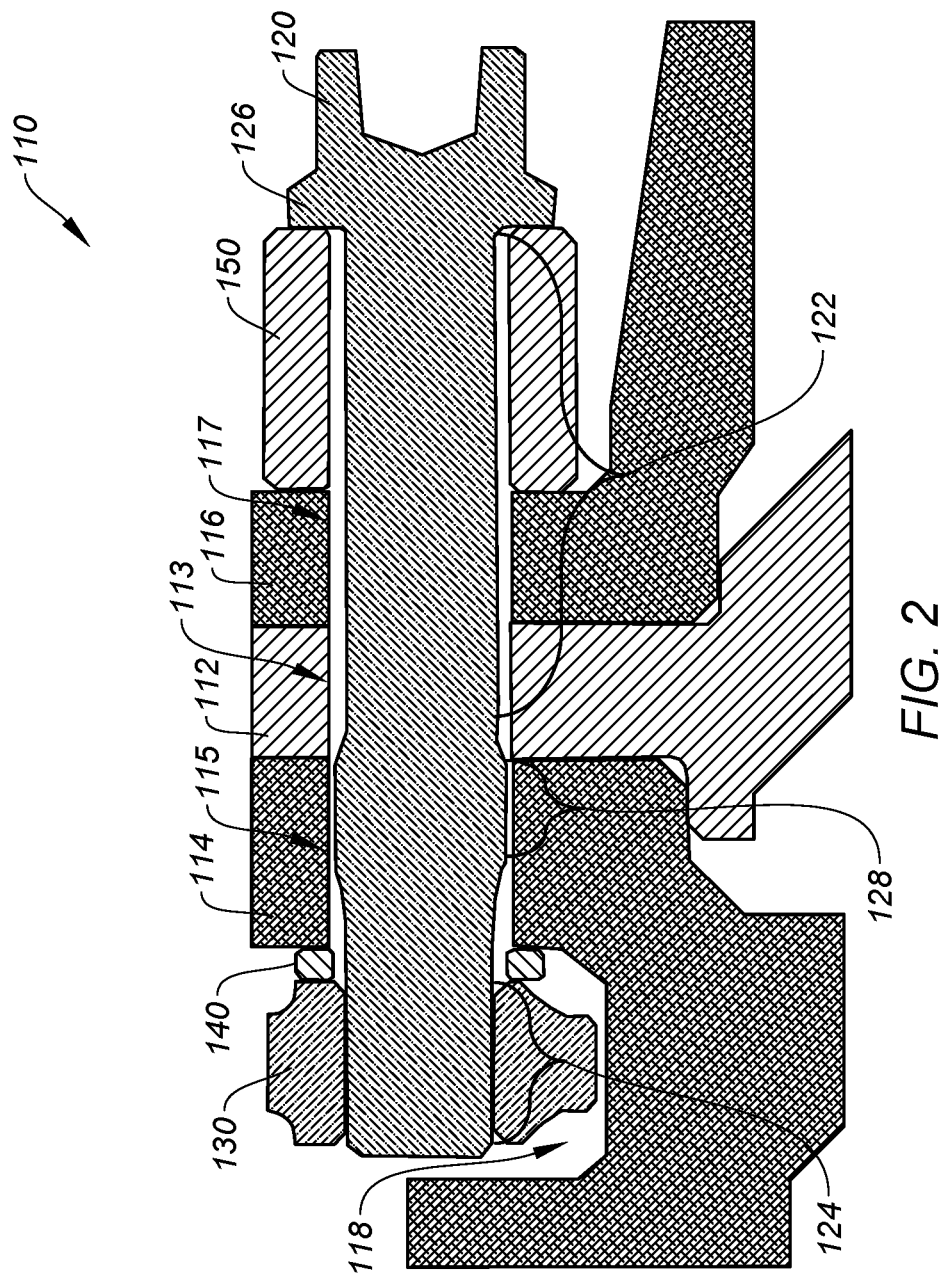
FIG. 2 is a partial diagrammatic sectional view of a casing of a gas turbine engine having a channel in the first flange.
Figure 4:
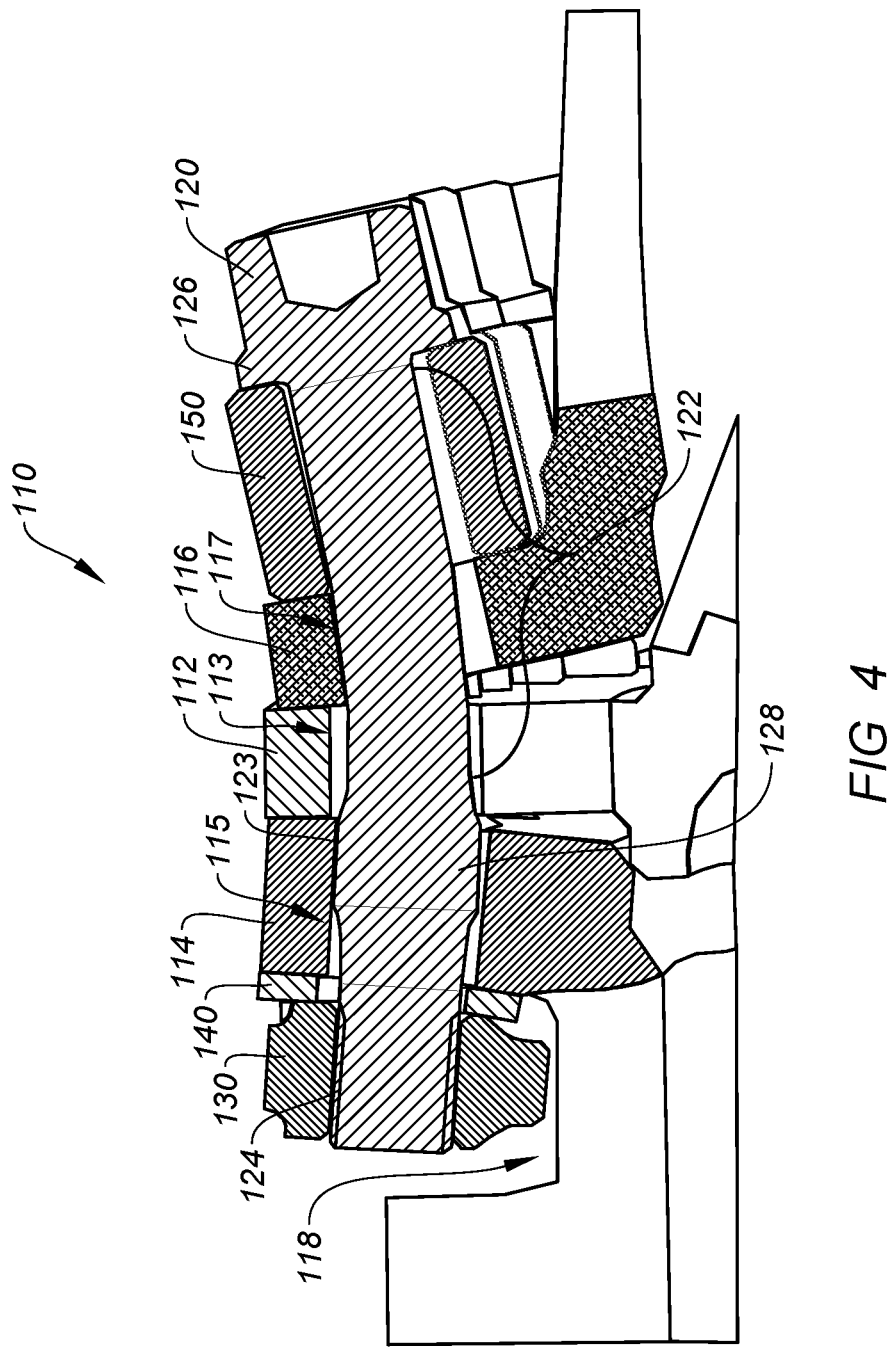
FIG. 4 is a partial diagrammatic sectional view of a casing of a gas turbine engine with the first flange and the second flange rotating away from the casing.

FIG. 1 illustrates a sectional view of a fastener assembly 10 for a connection between a casing 12, a first flange 14, and a second flange 16 for use in a gas turbine engine. The fastener assembly 10, 110 examples shown in FIGS. 1, 2, and 4 are shown on a fan casing 12, 112 of the gas turbine engine, but the present disclosure is not limited to use with a fan casing. It should be understood that the concepts described herein may be applied to a variety of casing architectures designed to handle significant out of balance loading; e.g., compressor casings and turbine casings. It should be noted that the terms "axial," "radial," and "circumferential" are used herein with respect to the longitudinal rotational axis of the casing, unless otherwise denoted.

The fastener assembly 10 that is used in the connection between the casing 12, the first flange 14, and the second flange 16 may utilize a high strength bolt 20 with an extended supporting shaft 22 and an extended axial length fastener 30 and spacer 40. The bolt 20 may have a thread portion 24 and the supporting shaft 22 may have a diameter that is greater than the diameter of the thread portion 24. The supporting shaft 22 engages holes 13, 15, 17 in the casing 12, the first flange 14, and the second flange 16. A first spacer 40 may surround a portion of the thread portion 24 of the bolt 20. A second spacer 50 may surround the supporting shaft 22. The fastener 30 and spacer 40 may require an extended axial length on the fastener end of the assembly 10. The spacers 40, 50 disclosed herein may have a yield strength (YS) that is less than the bolt 20 and the fastener 30. This allows the spacers 40, 50 to absorb a portion of the bending load and protect the integrity of the bolt. The spacers 40, 50 may reduce the bolt 20 stiffness, which allows for load sharing with adjacent bolts around the circumference of the casing 10. The spacers 40, 50 may also reduce the bending strain in the thread portion 24 of the bolt 20.

FIG. 2 illustrates a sectional view of a connection between a casing 112, a first flange 114, and a second flange 116 including a fastener assembly 110 that accommodates a shorter axial length on the end with the fastener 130. A bolt 120 extends through holes 113, 115, 117 in the casing 112, first flange 114, and second flange 116.

The bolt 120 may have a head 126 at a proximal end and a thread portion 124 extending from a distal end opposite the proximal end. The bolt 120 may have a pitch diameter shank 122 extending from the head 126 and a large shank 128 disposed between the thread portion 124 and the pitch diameter shank 122. The large shank 128 has a diameter that may be greater than both the thread portion 124 and the pitch diameter shank 122. The shank of the bolt 120 may have a smooth taper between each portion. The fastener assembly 110 illustrated in FIG. 2 may direct the bending strain in the bolt 120 away from the thread portion 124 to a smooth diameter portion of the shank (e.g., pitch diameter shank 122) with higher strength. In the first flange 112 embodiment shown in FIGS. 2 and 4, the fastener 130 and the first spacer 140 fit within a narrow channel 118.

The fastener 130 may releasably mate with the thread portion 124 of the bolt 120. A first spacer 140 may be retained between the fastener 130 and the first flange 112, and a second spacer 150 may be retained between the head 126 of the bolt 120 and the second flange 114. The first spacer 140 has an inner diameter greater than the outer diameter of the thread portion 124 and the second spacer 150 has an inner diameter greater than the outer diameter of the pitch diameter shank 122. The fastener assembly 110 may allow for separation of the first flange 112 and the second flange 114 from the casing of the gas turbine by allowing bending of the bolt along the pitch diameter shank (as depicted in FIG. 4). The pitch diameter shank 122 and the second spacer 150 may provide a more flexible section of the bolt 120.

The fastener assemblies 10, 110 illustrated in FIGS. 1 and 2 may be installed within numerous holes 13, 113 around the circumference of the casing 12, 112 and each may allow the flanges 14, 16, 114, 116 to rotate relative to the casing 12, 112. This rotation, in contrast to a rigid assembly, allows a portion of the loading to be transferred to adjacent fastener assemblies 10, 110 around the circumference of the casing 12, 112.

Figure 3B:
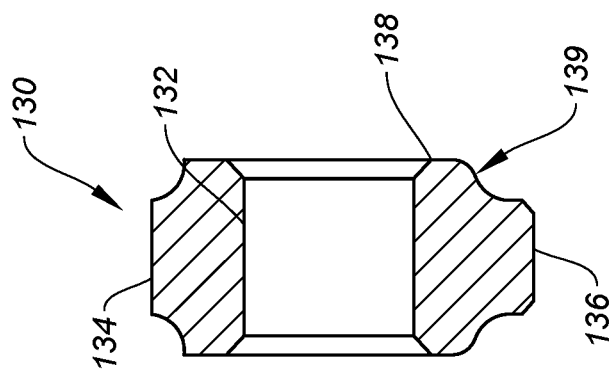
FIG. 3B is a sectional view of the fastener of FIG. 3A.
Figure 3A:
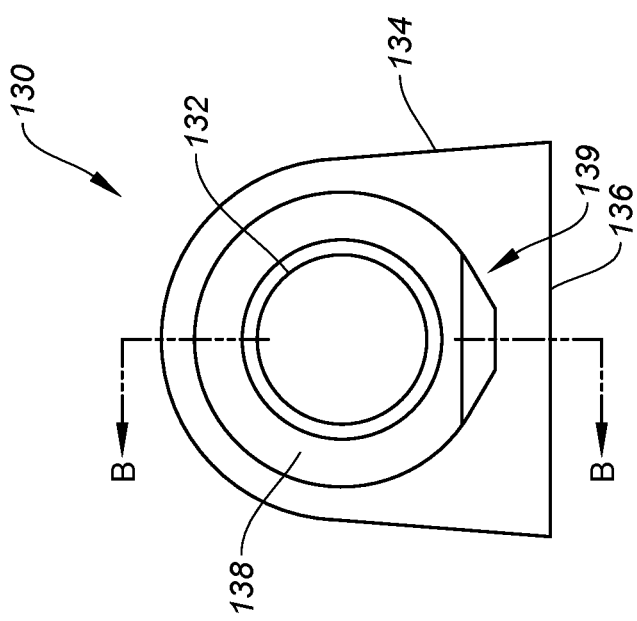
FIG. 3A is a planar view of a fastener.

FIGS. 3A and 3B illustrate an embodiment of the fastener 130 in greater detail. The fastener 130 may have an inner circumferential surface 132 with threading complementary to the thread portion 124 of the bolt 120 and an outer surface 134 interrupted by a mating surface 136. The mating surface 136 may be complementary to a surface within the channel 118 of the first flange 114 to prohibit rotation of the fastener 130 during rotation of the bolt 120 within the fastener assembly 110. The present disclosure is not limited to prohibiting rotation of the fastener 130 with a mating surface 136. The fastener 130 may include wiring through the fastener or plastically deforming the fastener (e.g., by peening) to prevent rotation of the fastener relative to the bolt 120.

The fastener 130 may have a face 138 disposed perpendicular to a longitudinal axis of the fastener 130. Referring to FIG. 3B, the illustrated face 138 is defined by an annulus that is interrupted by a relief 139. The face 138 may allow a pre-load to be maintained on the bolt 120 under normal operating conditions (e.g., when the rotor is properly balanced) and under windmill conditions when the load is lower, and the flanges 114, 116 are not separating from the casing 112. The relief 139 may allow the first spacer 140 and the face 138 of the fastener 130 to plastically deform to contribute to accommodating the separation of the flanges 114, 116 from the casing 112 of the gas turbine. The relief 139 is located at the circumference of the face 138 closest to the longitudinal axis of the casing 112 (e.g., each relief is positioned at the location closest to the center of the casing 112). The first spacer 140 may be capable of both elastic and plastic deformation. The relief 139 decreases the area of the face 138 that is in contact with the first spacer 140 to facilitate the plastic deformation of the first spacer 140 during significant flexure of the casing 112 (e.g., as depicted in FIG. 4). Plastic deformation of the first spacer 140 may alleviate some of the load from the bolt 120.

FIG. 4 diagrammatically illustrates a sectional view of a fastener assembly 110 with both flanges 114, 116 pried away from the casing 112. The large shank 128 of the bolt may engage the bolt hole 115 in the first flange 114 and the pitch diameter shank 122 bends about this engagement point 123 within the first flange 114 to allow both the first flange 114 and the second flange 116 to separate from the casing 112 and limits bending within the thread portion 124. The smaller diameter of the pitch diameter shank 122 and the clearance between pitch diameter shank 122 and the holes 113, 115, 117 in the casing 112, the first flange 114, and the second flange 114 enables the pitch diameter shank 122 to bend to absorb the energy of the periodic loading, permitting some flexure of the fastener assembly 110. In the embodiment illustrated in FIG. 4, the thread portion 124 is kept in a straight configuration while the pitch diameter shank 122 bends to a bent configuration. The structure of the fastener 130 and the bolt 120 within the casing 112, the first flange 114, and the second flange 114 may promote bending along the smooth pitch diameter shank 122 without exceeding its strain limit, which is stronger than the thread portion 124.

The present disclosure is described in terms of fastener assemblies 10, 110 for a fan casing 12, 112, the present disclosure is not limited to fastener assemblies 10, 110 for the fan casing 12, 112 and the present disclosure fastener assemblies 10, 110 may be configured for use elsewhere in a gas turbine engine, such as within the compressor casing.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements.

The invention claimed is:

1. A fastener assembly for affixing two flanges to a casing of a gas turbine engine, comprising:
    a bolt having a head at a proximal end and a thread portion extending from a distal end opposite the proximal end, the bolt having a pitch diameter shank extending from the head and a large shank disposed between the thread portion and the pitch diameter shank; and
    a fastener configured to releasably mate with the thread portion;
    wherein the fastener is configured to maintain a first flange in contact with the casing and the head of the bolt is configured to maintain a second flange in contact with the casing; and
    wherein the fastener assembly accommodates separation of at least one of the first flange and the second flange from the casing of the gas turbine engine by allowing bending of the bolt along the pitch diameter shank.

2. The fastener assembly of claim 1, wherein the fastener has an inner circumferential surface with threading complementary to the thread portion of the bolt and an outer surface interrupted by a mating surface; and
    wherein the mating surface is complementary to a surface of the first flange to prohibit rotation of the fastener during rotation of the bolt within the fastener assembly.

3. The fastener assembly of claim 2, further comprising a first spacer having an inner diameter greater than an outer diameter of the thread portion and disposed between the fastener and the first flange;
    wherein the fastener has a face disposed perpendicular to a longitudinal axis of the fastener and the face is interrupted by a relief; and
    wherein the relief allows at least one of the first spacer and the face of the fastener to deform to contribute to accommodating the separation of the at least one of the first flange and the second flange from the casing of the gas turbine engine.

4. The fastener assembly of claim 3, wherein the first spacer has a yield strength (YS) that is less than a yield strength (YS) of the fastener.

5. The fastener assembly of claim 3, wherein the fastener and the first spacer are disposed within a channel of the first flange.

6. The fastener assembly of claim 3, wherein the face is defined by an annulus interrupted by the relief extending from an exterior edge and towards an interior edge of the annulus; and
    wherein the relief extends from an exterior edge of the annulus located closest to a longitudinal axis of the casing.

7. The fastener assembly of claim 3, wherein deformation of the first spacer contributes to accommodating separation of at least one of the first flange and second flange from the casing.

8. The fastener assembly of claim 1, further comprising a second spacer having an inner diameter greater than an outer diameter of the pitch diameter shank and disposed between the second flange and the bolt head;
    wherein the second spacer contributes to allowing the bending of the bolt along the pitch diameter shank.

9. The fastener assembly of claim 8, wherein the second spacer has a yield strength (YS) that is less than a yield strength (YS) of the bolt.

10. The fastener assembly of claim 8, wherein at least one of the pitch diameter shank and the second spacer provide a flexible portion of the bolt.

11. The fastener assembly of claim 1, wherein the separation of at least one of the first flange and the second flange from the casing of the gas turbine engine allows for load sharing to adjacent fastener assemblies within the casing.

12. The fastener assembly of claim 1, wherein at least one of wiring and plastic deformation of the fastener affixes the fastener to the bolt.

13. The fastener assembly of claim 1, wherein the large shank engages a hole in the first flange to establish an engagement point and the pitch diameter shank bends about the engagement point.

14. The fastener assembly of claim 1, wherein the fastener assembly accommodates separation of at least one of the first flange and the second flange from the casing of the gas turbine engine when the pitch diameter shank bends to a bent configuration and the thread portion remains in a straight configuration.

15. A fastener assembly for affixing two flanges to a casing of a gas turbine engine, comprising:
    a bolt having a head at a proximal end and a thread portion extending from a distal end opposite the proximal end, the bolt having a pitch diameter shank extending from the head and a large shank disposed between the thread portion and the pitch diameter shank;
    a fastener configured to releasably mate with the thread portion;
    a first spacer having an inner diameter greater than an outer diameter of the thread portion and disposed between the fastener and the first flange; and
    a second spacer having an inner diameter greater than an outer diameter of the pitch diameter shank and disposed between the second flange and the bolt head;
    wherein the first spacer is configured to maintain a first flange in contact with the casing and the second spacer is configured to maintain a second flange in contact with the casing; and
    wherein the bending of the bolt along the pitch diameter shank and at least one of deforming the first spacer and deforming the second spacer contributes to accommodate separation of at least one of the first flange and the second flange from the casing of the gas turbine engine.

* * * * *